United States Patent

Colburn

[15] 3,648,428
[45] Mar. 14, 1972

[54] FILM-TO-FILM SKIN PACKAGING

[72] Inventor: Lyle W. Colburn, Midland, Mich.

[73] Assignee: The Dow Chemical Company, Midland, Mich.

[22] Filed: Feb. 20, 1968

[21] Appl. No.: 706,913

[52] U.S. Cl................53/21 FC, 53/22 A, 206/46 PV, 206/80 A
[51] Int. Cl.........................................B65b 31/00
[58] Field of Search.............53/22, 112, 21; 206/80 A, 46

[56] References Cited

UNITED STATES PATENTS

| | | | |
|---|---|---|---|
| 2,984,056 | 5/1961 | Scholl | 53/22 |
| 3,358,829 | 12/1967 | Smith et al. | 206/80 |
| 3,410,392 | 11/1968 | Hermanson | 206/46 |
| 3,481,101 | 12/1969 | Steadman | 53/22 |

FOREIGN PATENTS OR APPLICATIONS

| | | | |
|---|---|---|---|
| 566,645 | 11/1958 | Canada | 53/22 |
| 784,503 | 10/1957 | Great Britain | 53/22 |

*Primary Examiner*—Travis S. McGehee
*Attorney*—Zalkind and Horne, Lloyd E. Hessenaur, Jr., Richard G. Waterman and Griswold & Burdick

[57] ABSTRACT

The invention relates to film-to-film skin packaging of articles in which plastic films are placed above and below articles to be tightly packaged therein, effecting a sealed enclosure, and wherein said films are subjected to heat and suction in a vacuum forming machine causing adherence to each other. The primary purpose of the invention is to yield a tamper proof, sealed and airtight package, capable of retaining a controlled atmosphere therein. This is achieved by providing a perforate area on one film which marginally and closely surrounds the article to be packaged. Subsequently another film is applied to the article and both films are then subjected to heat and suction. By virtue of the marginal perforate area, evacuation of the enclosure due to suction effect is achieved. A plurality of packages may be made simultaneously by providing a plurality of nonperforate areas on the base film which are substantially congruous to contiguous areas of respective articles placed thereon. A secure film-to-film adhesion at the perforate areas closely surrounding the articles results; and the film used, if adhesively compatible with the articles packaged, adheres thereto. Thus, the film covering must be destroyed to remove the article. Likewise, where a paper or cardboard wrapper or carton initially encloses the article, e.g., a deck of cards, such wrapper materials can be adhesively compatible with the film so that the film adheres. Accordingly, the package is rendered tamperproof. Where the wrapper or carton is printed, the ink used can be adhesively compatible with the film. Further, by providing an insert in each package permeated with a selected media which volatilizes in the sealed package, a controlled and preserving atmosphere is achieved.

3 Claims, 10 Drawing Figures

PATENTED MAR 14 1972 3,648,428

INVENTOR
LYLE W. COLBURN

BY  Balkind & Horne

ATTORNEY

FILM-TO-FILM SKIN PACKAGING

Briefly, the invention contemplates skin tight packaging by means of plastic films where it is desired to have airtight packaging and/or packaging which requires destruction of the enclosure. Airtight packaging is necessary for foods, and in some instances, the package may incorporate a pad or layer of impregnated paper having preservative or anti-oxidant material or corrosion resistant material, etc.

Further, the characteristic of requiring destruction of the enclosure is important so as to render tamper proof certain types of goods; for example, playing cards. Thus, the package enclosure is formed of plastic film adhesively compatible with the package to be enclosed in the sense that the goods may be boxed in a cardboard box to which the hot film is caused to adhere during the course of vacuum forming. Alternatively, when a box is printed, the ink used would be adhesively compatible.

An essential feature of the invention resides in providing a slitted or perforate area in one of the films which forms the enclosure, such area being in a configuration so as to closely marginally surround a package placed on a non-perforate area surrounded by the perforate area.

The perforate area has a pattern such that the interior periphery thereof closely bounds the perimeter of the bottom of an article placed on the base film, when the article and base film are assembled in a vacuum former. Thereafter a cover film is placed over the article and the films with the article therebetween are subjected to heat and suction in a conventional vacuum former. The effect is to produce a package having a tightly drawn skin-like covering around the article with the cover film adhering closely to the base film in a flange which surrounds the article.

In the course of applying suction, air which would otherwise be trapped in the package is drawn out, to a large extent, through the perforate area, and the cover film material is pulled into the perforations and fuses therein due to an almost molten state, forming an excellent bond with the base film, much stronger than a mere surface to surface bond. Such a bond cannot be unsealed nor pried apart and must be torn apart to remove the article.

Other features, objects and variations of the invention will be described in conjunction with the detailed description to follow.

The invention differs from the known prior art, e.g., the U.S. Pat. No. to Wandelt, 2,750,719 wherein the aperture perimeter is far distant from the article and accordingly it is not possible to achieve high evacuation nor to procure an accurately controlled atmosphere in the package for vapor or gas volatilized from a permeated insert.

In the drawing:

FIG. 5 illustrates a plan view of a modified form of packaging utilizing a porous member insert which is an absorbent for a preservative or the like;

Figure 1:
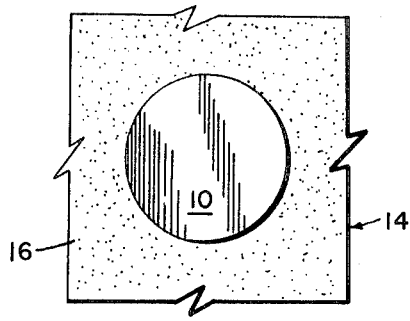
FIG. 1 is a fragmentary plan view of a perforate base film showing one article placed thereon in readiness to receive a cover film, it being understood that a plurality of spaced articles would be simultaneously packaged by the method of the invention.
Figure 2A:
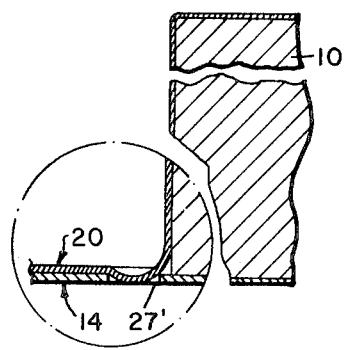
FIG. 2a is a magnified portion of the completed enclosure illustrating the interlocking effect of the films due to perforating of the base film, shown in cross-sectional elevation.
Figure 2:
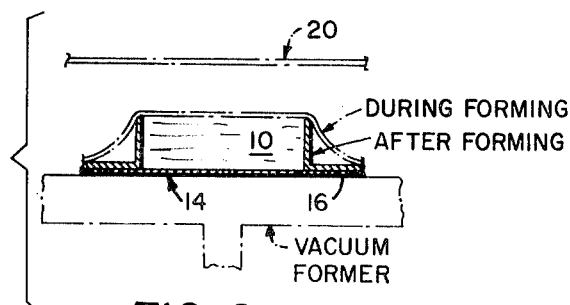
FIG. 2 is an elevation in cross section showing the article and base film on the platen of a vacuum former with a corresponding portion of cover film held over the article, the assembly being in readiness to be subjected to the heat and suction of forming into a film seated package.

Referring to the drawing, and in particular FIGS. 1 and 2, an article 10 to be packaged is shown placed on a base film 14 provided with a plurality of small perforations in a perforate area, as indicated at 16. It will be understood that the non-perforate area is substantially congruous with the contiguous bottom area of the article and that the perforate area pattern has an inner periphery which does not extend below the article. The perforation may be no larger than a sixty-fourth of an inch in diameter or less, and terminate short of the article by a small fraction of an inch, for example, a thirty-second of an inch; such dimension is not critical but merely a matter of choice for practical reasons depending upon the type of article being packed and the type of film being used.

The purpose of providing closeness of a perforate area to the perimeter of the article is to ensure outflow of as much air as possible from the film enclosure when suction is applied.

FIG. 2 shows the initial assembly of the article 10 on the base sheet 14, with a cover sheet 20 of the same type of film as the base sheet. The assembly is shown as disposed on a vacuum former bed ready to be subjected to heat and vacuum. The vacuum former may be of conventional type such as an Abbott Vacuum Former, Model AM2436PA.

The method of the invention yields a tightly packaged article having a skin-like covering of plastic film, as illustrated fragmentarily in FIG. 2a. A plastic film adhesively compatible with the article or with a carton in which the article is packed, or with the ink with which such a carton is printed, will bond thereto and be unpeelable therefrom. Such a film may be a thermoplastic polymer, i.e., a polymer, copolymer, terpolymer and the like or a structured film having two or more layers. The film thickness and type of film selected will be determined by its machinability in any given machine and the desired barrier properties required by the end user and/or the product being packaged. If an adhesive bond is desired to the carton being packaged, a random copolymer of ethylene/acrylic acid or other adhesive films would be recommended. It has been found that such films when heated in a vacuum former to a sufficient temperature will bond adhesively to cardboard and to various kinds of ink coated surfaces giving a very attractive transparent and extremely high gloss finish.

Inks for the purpose of this invention are made by Interchemical Corporation, and thermoplastic films suitable for the process are made by The Dow Chemical Company and other suppliers, it being noted that various types of plastic films are usable. Such films may be electrostatically or otherwise treated to promote adhesiveness, but the invention is not limited to treated films.

Of particular interest, as seen in FIG. 2a, is an indented bonding effect (considerably magnified) produced by the perforations, in that opposed areas of the cover film may be pulled into the perforations such as 27' of the base film if the perforations are made large enough. Inasmuch as the films are heated almost to the molten state, there would then be a strong fusion of the edges of each of the apertures with the material protruding thereinto whereby a mechanical interlocking is effected which cannot be separated except by destruction of the materials. The aperture size would depend on the thickness and temperature of the films for such edge fusion. For films of the kind contemplated for usual packaging purposes, an aperture diameter of about 1/16 inch – ⅛ inch are thought feasible.

Figure 2B:
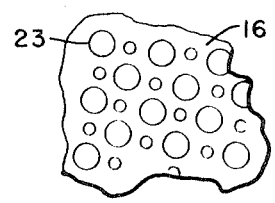
FIG. 2b is a fragmentary plan view of a perforate base film with interspersed embossing.

As hereinabove mentioned, in order to more fully withdraw air from the enclosure the base film may be provided with embossing and FIG. 2b illustrates a fragment of such film greatly exaggerated wherein the perforations are interspersed with embossed dimples of somewhat larger size, as indicated at 23.

Before proceeding to describe other forms of the invention it should be emphasized that the perforations of the perforate area 16 are very small and could, in fact, be needle holes produced by a die head, or roller carrying a plurality of needles and producing perforations at selected sites of only a few 100ths of an inch in diameter.

The effect produced by the teaching described is the packaging of an article with a material that is completely nonporous to air or relatively non-porous, an important consideration when articles are packaged which would be spoiled by oxidation, corrosion, humidity or gaseous ingredients or pollution of surrounding area. This is in contrast to prior art methods which rely on a porous base substrate or coated porous base substrate which has been uniformly perforated in order to apply suction thereto in the vacuum forming step and which substrates, therefore, do not achieve an airtight enclosure.

Referring now to the plan view of FIG. 3, the modification is practiced in the same manner as hereinabove described except that the perforations are in the form of radial slits 27 which form a circular pattern or ring around the article 10 to be packaged. Such slits may be exceedingly fine and in fact it is not necessary to actually remove any of the material from the film. In other words, the slits are merely cuts in the material which may go entirely through the thickness of the film (FIG. 4) or sufficiently through the thickness of the film so as to form weakened lines having a burst strength sufficiently less than the burst strength of the adjacent material, whereby, upon being subjected to suction in the vacuum former, particularly after heating, openings are formed by bursting of air through the weakened lines. Thus, in the aggregate the slits form a weakened burst strength area. The packaged article as shown in cross-sectional elevation in FIG. 4 illustrates how the cover film 20 hermetically seals around the article.

Figure 3:
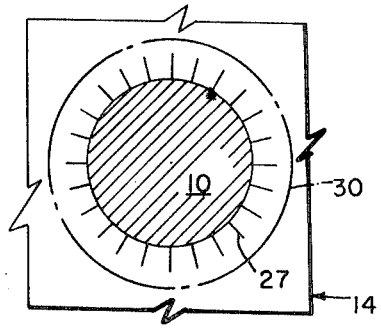
FIG. 3 illustrates another type of perforation usable in the method for the base film, shown in plan view with one article disposed thereon to be packaged.
Figure 4:
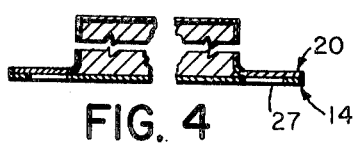
FIG. 4 is a sectional view in elevation showing a complete package, i.e., an article sealed within an enclosure of plastic film, as taught by the invention.

The phantom circle shown on FIG. 3 represents die cutting of an individual and finished package from a forming in plurality so as to provide a rounded flange 30. Preferably the edge of the flange should be radially beyond the slits 27 to eliminate weakening of the flange edge. However, where such weakening is not undesirable, the die cutting circle can pass through the slits which makes for considerable convenience in tearing through the flange in order to destroy the film enclosure. Such tearing readily follows any of the radial slits brought out to the flange edge.

Figure 4A:
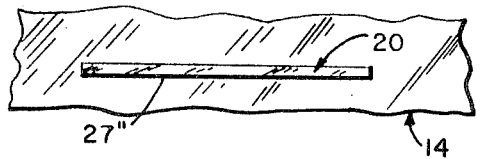
FIG. 4a is a fragmentary view to an enlarged scale, exaggerated for illustrating the mechanical bonding effect between the two films as can be produced by a perforation in the form of a slightly widened slit.

FIG. 4a is a greatly magnified illustration, in plan, to illustrate a protruding effect of the cover film into widened slits 27' of the base film, as viewed from the bottom of the package. For this effect of edge fusion slits 27" may be 1/16 inch - ⅛ inch, depending on the thickness and temperatures of the films.

Figure 5:
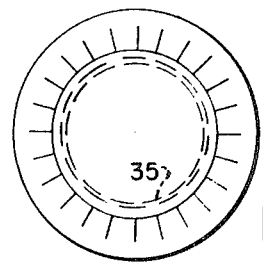
Figure 6:
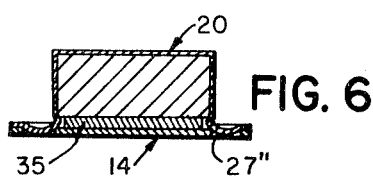
FIG. 6 is a cross section in elevation through a completed package made in accordance with FIG. 5.

The modification shown in FIGS. 5 and 6 is substantially the same as described above in connection with FIGS. 3 and 4 except that there has been added to the package a porous element 35 which may be of paper or cardboard or other material impregnated with a volatile material such as lubricant or any other selected substance intended to establish a controlled atmosphere to protect the contents of the enclosure or maintain freshness. For example, a water solution of sodium sulfite may be utilized as an oxygen scavenger where it is desired to maintain high humidity and rid the package of remaining oxygen.

It has been found practical in forming packages following the method of the invention, and using an Abbott Vacuum Former of the type identified above to utilize the following heating and vacuum conditions:

```
a. Preheat cycle                    8 sec.
b. Heat and vacuum cycle           10 sec.
c. Vacuum cycle
    (Vacuum at start, about
    24 in. Hg.)
```

The exact temperatures would, of course, be a matter of experience, depending upon types of film and thicknesses used, package configuration, and the like.

The slits in the form shown in FIGS. 5 and 6 may extend slightly under the overhang of the article; a matter of dimensions of the article relative to the size of the element 35, and the plasticity of the film.

It will, of course, be understood that the packaging method is performed simultaneously with a plurality of articles on a base sheet which is perforated in a pattern so that each article is placed on a respective non-perforate area congruous to the bottom contour of the article. Articles of differing plan contours may be packaged together. The subsequent plural package may be separated into individual packages by a cutting die or any other conventional method.

Figure 7:
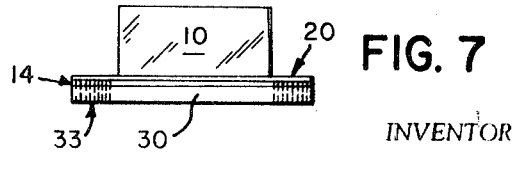
FIG. 7 is an elevation of a modified form of the invention wherein a rigid package base is effected by a base film laminated to a relatively rigid sheet of paper or cardboard.

Further, as shown in FIG. 7, a base film 14 may be laminated to a paper or cardboard backing 30 and then selectively perforated therethrough as indicated at 33, effecting a rigid base or board for the packaged article 10 which is thus hermetically sealed on a relatively rigid base. The perforating pattern for a plurality of non-perforate areas to take a plurality of articles would be essentially the same as for a flexible film base. The individual packages would, of course, be effected by die cutting after the vacuum forming operation or by other means of severance.

As a general proposition, the invention is particularly advantageous in the packaging field where a controlled environment is desired for preservation of articles. Thus, by minimizing the volume within the package not actually occupied by the article, the problem of environment control is simplified where a volatile media are used to impregnate a paper, cardboard or other insert.

Where food products, particularly meats, are being packaged, an oxygen scavenger such as a sodium sulfite, mixed with water can be utilized, wherein the water effects a humidified atmosphere. In such case, it is preferable not to completely evacuate the interior of the package since this would draw off the natural moisture of the meat and promote an undesirable drying out. Most of the air would be withdrawn from the package during the vacuum forming and depending upon the nature of the meat and the quantity, matters to be determined in specific applications, a small air residue would be permitted to remain so that the natural moisture of the meat would not evaporate.

Regarding the packaging of corrosive products which are subject to rusting, etc., such as metal machine parts and the like, the controlled environment is provided by permeating an insert member with an amine or morpholine. In such case, the drawing in of the thermoplastic film around the bottom of the article by providing an undercut at the periphery which would be effected by an insert member somewhat smaller in area is advantageous in promoting maximum air evacuation.

As described in previous passages throughout the specification, various diameters of holes or widths of slits are usable in the base film, and many factors enter into a particular dimensional arrangement of perforation and spacing. Those knowledgeable in the art will, in view of these teachings, be able to choose the proper aperture or slit size and spacing between apertures or slits concerned for any particular shape and size of box-tire or cylindrical article. Suffice it to say that the unperforate area on which an article is placed is substantially congruous with the contiguous face of the article but with rather limited latitude in accordance with the teaching of the invention.

For example, in the packaging of an ordinary deck of playing cards, it has been found feasible to use slit perforations, as in FIG. 3, about one-half inch long, spaced about one-half inch apart, although this would naturally be closer at each corner of the deck due to the angular relationship of the slits at the deck corners. The slits were transverse to the edges of the deck and the inner ends of the slits were spaced one-eighth inch around the deck of cards. For packaging decks in plurality, a separate rectangle of slits can be used for each deck, or the decks could be arrayed so that rows of slits would be common to adjoining decks. In the example just given, the slits were merely knife cuts with no material removed.

As another example, ball bearings about 3 inches in diameter and three-fourths inch in thickness can be packaged by practice of the invention. A ring of round apertures surrounded the unperforated area on which the ball bearing is placed, the apertures being approximately one-eighth inch from the bearing periphery and more or less randomly spaced ¼ inch to ⅜ inch circumferentially from each other, and being about one-sixteenth inch in diameter.

Where a single bearing is to be packaged, a single ring of apertures thus closely surrounding the bearing is probably sufficient although for providing a larger radial flange of sealed area for the finished package, an additional ring of apertures spaced radially one-fourth inch or so from the first ring would be used. FIG. 5 shows such a flange, but utilizing slits instead of holes. Within size limitations of the film and forming machine, a plurality of such bearings can be simultaneously packaged, spaced about 1 inch apart (in the X and Y directions) to allow for two rings of perforations around each. The waste areas of the film, beyond the rings of perforations, are preferably provided with larger perforations to expedite air passage during forming.

The films usable in the above examples can be 6 mils thick for base and cover films, and of ethylene/acrylic acid copolymer. An Abbott Vacuum former is usable with heat and vacuum conditions as follows:

| Preheat: | 7–9 seconds |
| Heat and Vacuum: | 7–10 seconds |
| Vacuum (26" Hg.): | 10 seconds |

What is claimed is:

1. A method of skin packaging articles with thermoplastic film which comprises providing a base film with a perforate area surrounding a non-perforate area, placing an article to be packaged on said non-perforate area, placing a cover film over said article, and subjecting said films to heat and suction to effect an enclosure of said article and to effect adherence of said films to each other at said perforate area, wherein said non-perforate area is substantially congruous to the contiguous area of said article; including positioning a member below said articles on said base film in an area less than the non-perforate area whereby film is drawn inwardly around said member when subjected to heat and suction.

2. A method as set forth in claim 1, wherein said member is impregnated with a volatile material to provide an atmosphere of said material within said package subsequent to packaging of said article.

3. A method of skin packaging articles with thermoplastic film which comprises providing a base film with a perforate area surrounding a nonperforate area, placing an article to be packaged on said nonperforate area, placing a cover film over said article, and subjecting said films to heat and suction to effect an enclosure of said article and to effect adherence of said films to each other at said perforate area, wherein said nonperforate area is substantially congruous to the contiguous area of said article; said article being spaced from said base film to effect drawing in of said cover film about the bottom periphery of said article.

* * * * *